United States Patent [19]

Fellrath

[11] 4,053,836
[45] Oct. 11, 1977

[54] DEVICE FOR TRANSMISSION OF INFORMATION BY PULSE CODE FREQUENCY SHIFT MODULATION

[75] Inventor: Jean Fellrath, Neuchatel, Switzerland

[73] Assignee: Centre Electronique Horloger S.A., Neuchatel, Switzerland

[21] Appl. No.: 604,196

[22] Filed: Aug. 13, 1975

[30] Foreign Application Priority Data

Aug. 22, 1974 Switzerland ............... 11477/74

[51] Int. Cl.² .................. H04B 1/26; H04L 27/14
[52] U.S. Cl. ............................. 325/320; 178/88; 325/419
[58] Field of Search ............. 178/66 R, 66 A, 88; 325/320, 30, 419, 163; 329/104, 122; 331/18, 25; 332/9

[56] References Cited

U.S. PATENT DOCUMENTS

| | | |
|---|---|---|
| 2,955,199 | 10/1960 | Mindes ............... 325/435 |
| 3,032,650 | 5/1962 | Mathison et al. ............... 325/419 |
| 3,163,823 | 12/1964 | Kellis ............... 178/88 X |
| 3,358,240 | 12/1967 | McKay ............... 325/419 |
| 3,371,281 | 2/1968 | Powell ............... 325/419 |
| 3,737,578 | 6/1973 | Matsuo ............... 178/67 |
| 3,794,928 | 2/1974 | Stump ............... 325/320 X |
| 3,860,874 | 1/1975 | Malone ............... 325/320 |

*Primary Examiner*—Robert L. Griffin
*Assistant Examiner*—Marc E. Bookbinder
*Attorney, Agent, or Firm*—Imirie & Smiley

[57] ABSTRACT

A device for transmission of information by pulse code frequency shift modulation. The device incorporates a phase-locked superheterodyne receiver including a single voltage controlled oscillator, and a demodulator including a phase comparator and a phase shifter. The intermediate frequency is equal to one half the input signal frequency shift. The comparator compares the phases of the intermediate frequency signal and of a signal of the same frequency derived from the voltage controlled oscillator to provide a message output.

8 Claims, 6 Drawing Figures

DEVICE FOR TRANSMISSION OF INFORMATION BY PULSE CODE FREQUENCY SHIFT MODULATION

BACKGROUND OF THE INVENTION

The present invention concerns a device for the transmission of information by pulse code modulation. It also concerns a use of this transmission device.

Pulse code modulated transmissions (PCM) have long been known and applied with advantage. The signal to be transmitted, called a message, is constituted by binary digits selected from the alphabet "O" "I". It is obtained either directly from a source of digital information (keyboard, computer, etc) or by digitalisation of a similar continuous signal. This representation of the message is called PCM.

The message may be transmitted by directly modulating a carrier. For technical reasons it is sometimes necessary to pre-modulate at first a sub-carrier.

The carrier or sub-carrier normally may be frequency or phase modulated. But as the modulating signal is a digital message, these particular techniques such as frequency or phase shift modulation are preferred. Both types of modulation have their applications: In this case we are interested only in frequency shift modulation.

Frequency shift modulation is usually referred to by the sign FSK which comes from the English term "Frequency Shift Keying". In this process, the message $m(t)$ modulates the frequency of a carrier or a sub-carrier for giving a message $m^*(t)$ in which the digits " " and "1" are characterised by two frequencies $f_o$ and $f_1$ attributed to the carrier or sub-carrier.

The frequency shift may be defined as the difference of the two frequencies $f_o$ and $f_1$. It is necessary to distinguish, at least theoretically, between coherent and incoherent modulation. In the first case, the phase of the carrier or sub-carrier is the same for all the digits of the same value in the message. In the second case, it varies as a function of the position of the digits. Incoherent modulation is more used in practice and the process of the present invention is associated with this category.

In addition, the phase-locking device has long been known and used for receiving and filtering signals.

SUMMARY OF THE INVENTION

The present invention proposes a device in which a new process of transmission by frequency shift keying associated with a new design of a phase-locking receiver is applied for the transmission of digital information with a very slow rhythm. The design of the receiver makes it possible to provide an individual miniaturized portable apparatus consuming very little power.

The device according to the present invention is characterised in that the two characteristic frequencies of the digits "O" and "I" are in a predetermined ratio and in that the phase-locking superheterodyne receiver comprises only one local oscillator, its intermediate frequency being half the input frequency shift, said shift being defined by the difference between the two characteristic frequencies of the digits "O" and "I". Further the demodulator is constituted by a phase detector in which the intermediate frequency signal and a signal of the same frequency obtained from the local oscillator are compared. This detector determines whether, in balance, the phase between these signals is nearer to 0° or 180°.

This present device may be used in a personal paging system covering a single building or a large region. Bio-medical electronics may represent another field of application; for example, a remote control system, incorporating an implanted receiver.

In a particular application of the invention the local oscillator of the receiver, which is synchronized by the input signal, is used as a frequency standard in a watch.

BRIEF DESCRIPTION OF THE DRAWINGS

The present invention will be described further, by way of example, with reference to the accompanying drawings, in which:

FIG. 1 shows the main components associated with a known phase lock loop.

A phase comparator 101 compares the phase of the periodic input signal A with the phase of the signal H of the controlled oscillator 301. An error voltage $u_e$ at the output of the phase comparator 101 is a measure of the difference between the phases of the two signals A and H. The error voltage $u_e$, filtered by the loop filter 201, is applied to the controlled oscillator 301. A voltage $u_s$ supplied to the input of the controlled oscillator 301 modifies the frequency thereof, tending towards a reduction of the phase difference between the input signal A and the controlled oscillator signal H. When the loop is "locked", the error voltage $u_e$ is such that the frequency of the controlled oscillator 301 is exactly equal to the average frequency of the input signal A. The averaging action is provided by loop filter 201.

Assuming that the input signal is noisy, the phase-locking receiver reproduces the signal by using a controlled local oscillator, the frequency of which approaches that of the input signal. The output of the phase comparator measures the instantaneous phase deviation. In order to suppress the effect of the noise, the average over a certain period of the error voltage, delivered by the loop filter, is used to control the local oscillator.

If the input signal has a stable frequency, the local oscillator will require very little information to lock onto the input signal. This information may be obtained by working out the average over a long period of time, thereby eliminating a very large noise.

It is therefore reasonable to consider the loop as a kind of filter which allows the signal to be passed through and rejects the noise. Two important characteristics of this filter are its very narrow bend width and its property of finding and locking automatically onto the input signal. These features are the known advantages of phase-locked systems. It is usual to use this type of circuit in receivers for extracting a signal deeply embedded in the noise.

The error voltage of a phase-locked loop adjusts itself so that the frequency of the controlled oscillator is the same as that of the input signal. If the frequency of the input signal varies, the error voltage will vary likewise. A message $m^*(t)$, in which the digits "O" and "I" are characterised by the values $f_o$ and $f_1$ received by the carrier (FSK signal), will be easily demodulated by the phase-locking device, that is to say, the error voltage will represent the digits "0" and "1" of the original message $m(t)$ by two distinct values. This property is often utilised in FSK receivers.

Figure 1:
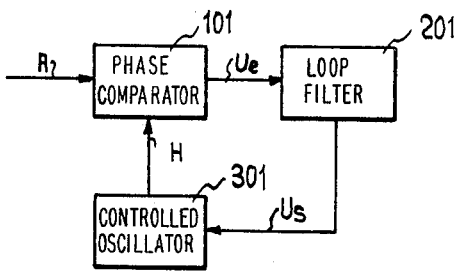
FIGS. 1 and 2 are block diagrams which show known prior art receivers.
Figure 2:
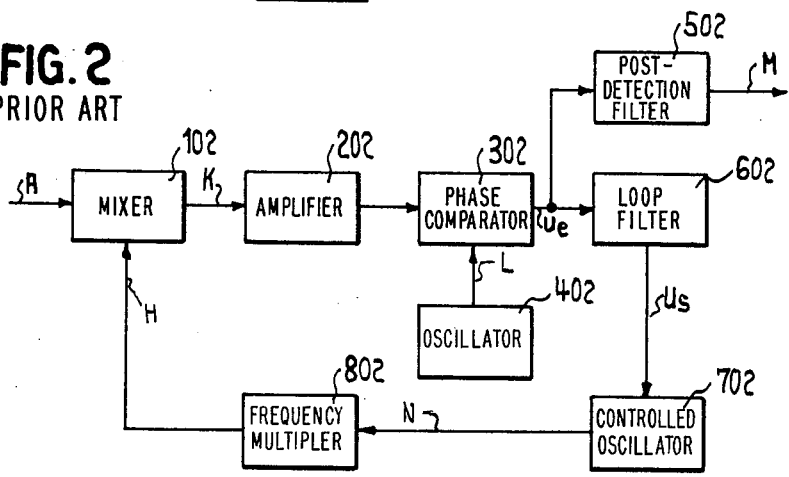

For many reasons the simple phase-locking receiver is rarely employed. A frequency translation according to the superheterodyne principle, known from conventional receivers, is almost always effected. One of the possible methods is shown in FIG. 2.

From the input signal A having frequency $f_1$, a signal K of intermediate frequency $f_3$ is obtained in a mixer 102. This signal passes via an amplifier 202 to a phase comparator 302 which compares the phase of the intermediate frequency signal K with the phase of a signal L having frequency $f_4$ issuing from a fixed oscillator 402. The error voltage $u_e$ is applied, on the one hand to a post-detection filter 502 which gives the message M and, on the other hand, to a loop filter 602. The output of the filter 602 controls the controlled oscillator 702, the output signal N of which, having frequency $f_5$, first passes into a frequency multiplier 802 which delivers a signal H of frequency $f_2$ to the mixer 102.

The mixer is a conventional component of the superheterodyne receiver. The intermediate frequency value is obtained by the equation:

$$f_3 = |f_1 - f_2|$$

The receiver has a sensitivity which is the same for two input signals having different frequencies $f_{1a}$ and $f_{1b}$, called image frequencies and separated by twice the intermediate frequency $f_3$.

The relation $f_{1a} > f_2 > f_{1b}$ is followed, in which:
$f_{1a}$ is the upper image frequency and
$f_{1b}$ is the lower image frequency.

The equilibrium of the loop imposes equality between the intermediate frequency and the fixed oscillator frequency.

The operation of the superheterodyne receiver is similar in every respect to the operation of the simple receiver. The superheterodyne receiver makes it possible to amplify the signal of intermediate frequency rather than a signal of input frequency.

The frequency multiplier 802 is used to avoid the need for high a frequency controlled oscillator. However, the receiver shown in FIG. 2 is unable to distinguish the upper and lower image frequency, but it will only detect and transmit to the output the modulation of each of such frequencies. In other language, it is impossible with the receiver shown in FIG. 2 to use the unmodulated carriers at the image frequencies for transmitting for instance the logic signals "1" and "0", because exactly the same intermediate frequency would be applied to the phase comparator 302 for each input signal at image frequency. Since no clear phase relationship between this signal at intermediate frequency and the signal from the uncontrolled local oscillator 402 exists, it is impossible to determine whether the upper or lower image frequency is being received.

The aim of the present invention is to adapt a superheterodyne FSK receiver to the special requirements imposed by a very small apparatus with low energy consumption and wherein the information may be transmitted by means of unmodulated carrier signals at image frequency. One preferred application is a personal miniaturized receiver incorporated in a paging system.

The features which should satisfy the transmission system according to the present invention may be summarised as follows:

Due to the fact that the receiver may be located in an area of noisy static interference and has only a small antenna, hence giving a poor reception and therefore causing the internal noise contribution of the receiver to be considerable, the spectral density of input noise is high. To maintain an acceptable signal-to-noise ratio, the pass band of the receiver should be narrow and, consequently the capacity of the channel low, of the order of magnitude of 1 bit/sec. This implies a low value intermediate frequency.

The carrier frequency band attributed to this type of use is in the 100 MHz range.

The frequency shift, defined by the difference in the frequencies of the two input signals, is fixed at 20 KHz, for example.

The controlled oscillator should be of high inherent stability. A good choice is an oscillator guided by a quartz crystal, the frequency of which is selected to enable use of a sturdy and cheap quartz crystal. This frequency is located in the region of 4 MHz. The drift of the oscillator for this type of quartz crystal is of the order of $10^{-5}$ if expensive thermal compensation is to be avoided.

The known receiver shown in FIG. 2, has several disadvantages and serious limitations with regard to the desired object:

I. This is an expensive solution. It is even questionable if, in presence of a low signal to noise ratio, the high stability required from the oscillator is possible.

II. The receiver shown in FIG. 2 includes circuits working at high frequency, namely the mixer 102 and the frequency multiplier 802. In a miniaturized embodiment, when inductances are out of the question, it is not possible to eliminate by resonance the effect of the stray capacitances of these high frequency circuits, so that the power consumption, which increases with the operating frequency, may be excessive for the available energy source.

III. From the point of view of the capacity of the transmission channel, two limitations should be taken into consideration, namely the limitation due to phase-locking and the limitation due to noise.

With regard to the limitation due to phase-locking, it should be remembered that, for transmission by frequency shift, two separate frequencies $f_o$ and $f_1$ are attributed to the two digits "0" and "1" of the message.

The limitation due to phase-locking, in the case of a known frequency shift system, stems from the difficulty experienced by the control loop in pulling in and locking onto a signal whose frequency varies. From this point of view, the most favourable signal is the progressive shift from one frequency to the other. During analysis of the differential equation of the loop, it becomes evident that an important physical parameter should be defined, i.e. the natural angular frequency of the loop, symbolised by $\omega_n$.

By studying the complete differential equation of the system, including the loop filter, it will be ascertained that the loop remains locked, i.e. the frequency of the local oscillator will follow that of the input signal if the slope of the frequency ramp of the input signal is less than a given limit value. For a loop of the second order, the condition to be satisfied is:

$$\frac{\Delta\omega_1}{\Delta t} \leq \omega_n^2$$

in which $\Delta\omega_1$ is the difference in the pulsations corresponding to the digits "0" and "1", and $\Delta_t$ is the transition time from one pulse to the other.

The phenomenon of acquisition has been studied by Viterbi in his work "Principles of coherent communication" (MacGraw Hill 1966) and leads to a condition a little more severe than the preceding condition. Viterbi gives, for a loop of the second order:

$$\frac{\Delta\omega_1}{\Delta t} \leq \frac{1}{2} \cdot \omega_n^2$$

We can admit that the transmission rhythm limit $F_1$ corresponding to a frequency ramp satisfies the ratio:
$$F_1 \leq (1/\Delta t)$$

Combination of the two equations gives:

$$F_1 \leq \frac{0.5 \, \omega_n^2}{\Delta\omega_1}$$

Thus, the transmission rhythm limit $F_1$ is inversely proportional to the frequency deviation ($\Delta\omega_1/2\pi$). It is therefore important to make $\Delta\omega_1$ as small as possible. However, the demodulated signal is obtained at the output of the phase comparator. In order to distinguish it from the error voltage correcting the various drifts of the controlled oscillator, $$\Delta\omega_1 > \frac{\Delta\omega_5}{\omega_5} \omega_1$$
is necessary in which
$$\frac{\Delta\omega_5}{\omega_5} \omega_1 = \frac{\Delta f_5}{f_5} \cdot 2\pi f_1$$

is proportional to the free frequency drift to the controlled oscillator returned to the input.

It should be noted that this last consideration is valid only if the transmission rhythm is of the order of magnitude of the drift time constant of the controlled oscillator. If the rhythm is faster, as is often the case in practice, it is possible to separate the information from the error voltage by switching the frequencies.

From the point of view of noise, the phaselock receiver behaves like a filter having a bandwidth $B_L$. It is possible to define a channel and transmit thereto a rhythm, where the limit is given by the noise $F_3$ defined as follows:

$$F_3 \leq B_L.$$

The noise bandwidth $B_L$ is bound to the physical parameters of the loop by a ratio given by Gardner in his work "Phaselock technique" (J. Wiley (1967). For an optimal second order loop we have $B_L \cong (\omega_n/2)$.
Finally, we have:
$F_3 \leq (\omega_n/2)$.

It is obvious that the most severe limitation determines the transmission rhythm. The latter establishes the post-detection bandwidth $B_{dem}$, that is to say, the useful bandwidth of the transmission channel.

The above equations permit a comparison between the transmission rhythms.

$$\frac{F_1}{F_3} = \frac{1}{\pi} \frac{B_L}{\Delta f_1}$$

$F_1$ = rhythm limit corresponding to a frequency ramp,
$F_3$ = rhythm limit determined by the noise.

For optimal use of the transmission channel, it is desirable that both these limits should coincide. This is the best compromise, taking into account both the limitations due to phase locking and the signal-to-noise ratio.

It will then be found that, with the known frequency shift system, it is not possible to equalize the limits $F_1$ and $F_3$ if the free frequency drift of the controlled oscillator, expressed in terms of input frequency, is greater than the noise bandwidth of the control loop. The useful bandwidth is determined by limitation due to locking and the channel is then badly used.

Figure 3:
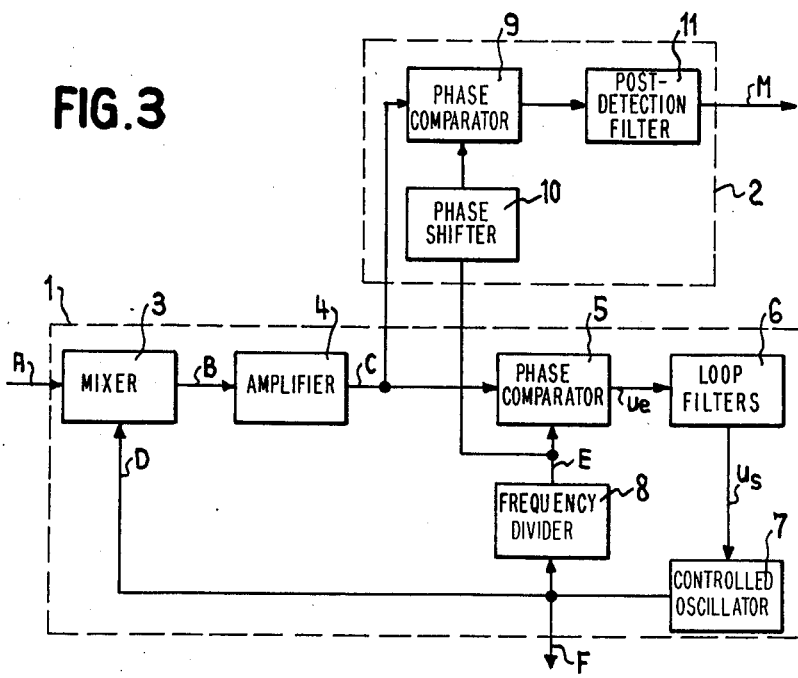
FIGS. 3 – 5 are block diagrams which show various embodiments of a receiver used in a device according to the present invention.

FIG. 3 shows a first embodiment of the present invention in which two principal parts of the circuit are distinguished: the frequency receiver 1 and the demodulator 2. The frequency receiver comprises a mixer 3 receiving the input signal A, the frequency of which is either $f_o$ or $f_1$ corresponding to the two digits "0" and "1" of the message. The mixer 3 also receives a signal D of frequency $f_2$ and delivers a signal B of intermediate frequency $f_3$ which then passes into an amplifier 4. The amplifier 4 delivers a signal C of frequency $f_3$ to a phase comparator 5 providing an error voltage $u_e$ which, after passing through a loop filter 6, is transformed into an output voltage $u_s$ which controls the controlled oscillator 7. The oscillator 7 supplies with the signal D of frequency $f_2$ the mixer 3 and also feeds a frequency divider 8, the output of which is connected to the phase comparator 5. The error voltage $u_e$ at the output of the comparator 5 is, therefore, a measure of the phase difference between the signal C and the signal E (having frequency $f_4$) at the output of the divider 8. In the demodulator 2 a second phase comparator 9 compares the phase of the signal C and that of the signal E phase shifted by $\pi/2$ in the phase shifter 10. The result of this comparison then passes through a postdetection filter 11 to give the message M.

The frequency receiver 1 operates partly in the same manner as the known receiver. Like the known receiver, the frequency receiver 1 is also sensitive to two input signals having frequencies $f_1$ and $f_o$ separated by double the intermediate frequency $f_3$. Frequencies $f_1$ and $f_o$ are called image frequencies. From the equations of the system it can be proved that an angle of static equilibrium $\Phi_n$, defined by the difference in the phases of the signals C and E measured by the error voltage $u_e$, is possible and stable. For the transmission of the message, a particular frequency shift modulation is used, in which the image frequencies $f_o$ and $f_1$ correspond to the two digits "0" and "1" of the message.

The demodulator 2 compares, in comparator 9, the phase of the received signal, converted and amplified into an intermediate frequency $f_3$, with the phase of a signal coming from the controlled oscillator 7 and obtained from the output of the frequency divider 8 phase shifted by $\pi/2$, and feeds the comparator output through filter 11 to provide a demodulated signal M at its output. Due to the design according to the present invention, the demodulated signal changes polarity whenever the input signal changes from one frequency to the other.

The receiver is based on the important property of the point of rest of the phase control loop measured by $u_e$ being the same for both input signals $f_1$ and $f_o$.

Moreover, if the specific frequency of the controlled oscillator drifts, or if the frequencies of the input signal drift, this property is maintained, as long as the frequencies of the input signals are in a predetermined and constant ratio. This ratio is $$\frac{f_1}{f_o} = \frac{1 + \frac{1}{q}}{1 - \frac{1}{q}} \qquad (I)$$

in which $q$ is the dividing ratio of the frequency divider 8.

On the other hand, the shift of one signal to the other is accompanied by a transitory phenomenon which, for the controlled oscillator, is equivalent to a phase jump of the intermediate frequency signal only. Due to the proposed design of the receiver and the signal, a jump and, possibly, a frequency ramp is therefore replaced by a simple phase jump.

For one of the two input signals, the angle of rest $\phi_r$ is between $-(\pi/2)$ and $+(\pi/2)$; for the other, it is between $(\pi/2)$ and $(3\pi/2)$.

The limitation of the useful bandwidth of the channel due to phase-locking originates, in the case of the system according to the present invention, from the time taken by the system to re-establish equilibrium after a phase jump. It can be shown that, for any phase jump, the useful bandwidth of the transmission channel is equal to the noise bandwidth of the control loop. In other words, the rhythm limit corresponding to a phase jump and the rhythm limit determined by the noise are made equal, thus permitting optimal use of the transmission channel.

Here are, by way of example, the typical characteristics of a transmission system according to the present invention.

Frequency corresponding to digit "O"
$f_o = 110.990$ MHz   given frequency corresponding to digit "I"
$f_i = 102.010$ MHz   given frequency shift
$\Delta f = |f_1 - f_o| = 20$ KHz Intermediate frequency
$f_3 = \frac{\Delta f}{2} = 10$ KHz frequency of controlled oscillator
$f_2 = \frac{f_o + f_1}{2} = 102.000$ MHz division factor of the frequency divider
$q = \frac{f_2}{f_3} = 10200$ drift of the local oscillator
$\frac{\Delta f_2}{f_2} = 10^{-5}$   given drift of local oscillator relative to the input frequency
$\frac{\Delta f_2}{f_2} \cdot f_o \approx 1000$ Hz Noise bandwidth of the -continued phase control loop
$B_L = 1$ Hz   given Maximum transmission rhythm for the known system
$F_2 = \frac{1}{H} \frac{B_L^2}{\Delta f_1} = 1/3000$ bit/sec Maximum transmission rhythm for the system of the present invention $F_2 = B_L = 1$ bit/sec For the particular case above, the proposed system permits, with the same control loop characteristics, that is to say, the same frequency receiver, the transmission of a flow of information 3000 times higher than the known frequency shift system.

Figure 4:
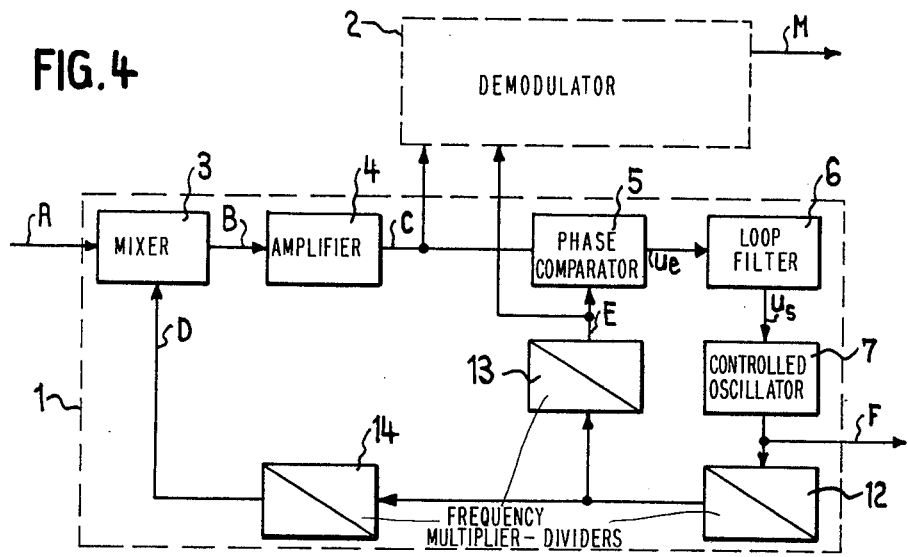

FIG. 4 shows a second embodiment of the present invention. The demodulator 2 remains the same as that in FIG. 3, the frequency receiver 1 itself is characterised by the multiplier-dividers 12, 13 and 14. The first multiplier-divider 12 is connected to the output of controlled oscillator 7, the second multiplier-divider 13 is connected between the first multiplier-divider 12 and the phase comparator 5, the third multiplier-divider 14 is connected between the first multiplier-divider 12 and the mixer 3.

The multiplier dividers 12, 13 and 14 make it possible to obtain, from an input signal having frequency $f$, an output signal having frequency $(p/q) \cdot f$ where $p$ and $q$ are positive integers.

On the other hand, the receiver shown in FIG. 4 operates in the same manner and has the same properties as the receiver in FIG. 3. In addition, the multiplier dividers 13, 14 enable input signals to be received the frequencies of which may be selected arbitrarily, whilst maintaining a given nominal value of the specific frequency of the controlled oscillator.

The numerical values given above may remain as they are, except the controlled oscillator frequency. The latter may be establish at 4MHz, a favorable value for a quartz crystal, in which case the frequency division and multiplication factors are $f_6 = \frac{P_{12}}{q_{12}} f_5 = 2$ MHz hence $P_{12} = 1$  $q_{12} = 2$ $f_2 = \frac{P_{14}}{q_{14}} f_6 = 102$ MHz hence $P_{14} = 51$  $q_{14} = 1$ $f_4 = \frac{P_{13}}{q_{13}} f_6 = 10$ KHz hence $P_{13} = 1$  $q_{13} = 200$ in which: $p_{12}, q_{12}; p_{13}; q_{13}; p_{14}; q_{14}$ are the respective multiplication and division factors 12, 13 and 14.

$f_5$ is the frequency of the local oscillator 7
$f_6$ is the frequency at the output of the multiplier divider 12
$f_4$ is the frequency of the signal E and
$f_2$ is the frequency of the signal D.

The ratio of the characteristic frequencies $f_1$ and $f_o$ of the digits "I" and "O" is bound to the ratios of the multiplier dividers by the following formula $$\frac{f_1}{f_o} = \frac{q_{14} P_{13} + P_{14} q_{13}}{P_{14} q_{13} - q_{14} P_{13}}$$

Figure 5:
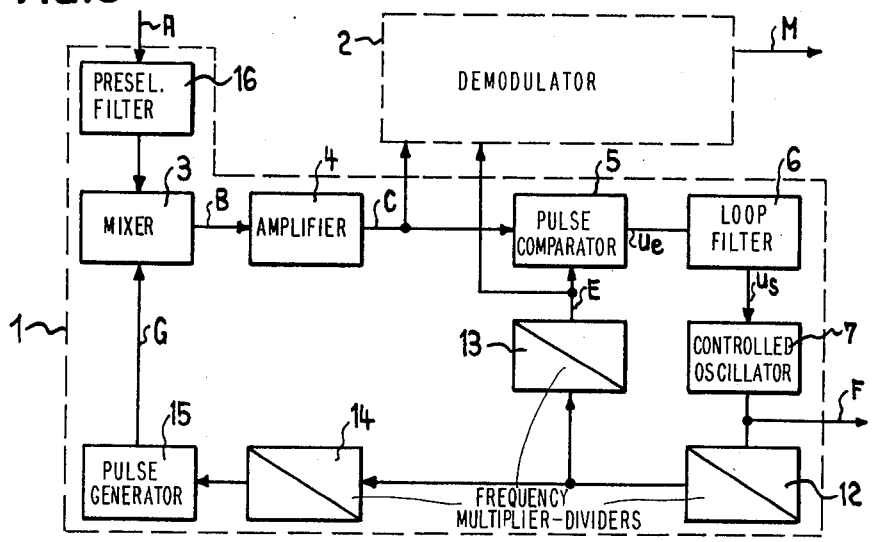

The design of the receiver according to FIG. 5, which shows a third embodiment of the invention, differs from that of FIG. 4 in that a pulse generator 15 is located at the output of the multiplier divider 14 and a preselection filter 16 is located at the input of the frequency receiver 1. The mixer 3 used is also different from that of the previous embodiments. In fact, the first conversion is made by sampling the input signal A, the frequency of which is high, by means of low frequency pulses G from the pulse generator 15. The transit time of the pulses G should be less than the half period of the high frequency signal. The operations of the receivers shown in FIGS. 4 and 5 are similar. However, the receiver shown in FIG. 5 is sensitive to the whole of a spectrum of frequencies separated by the value of the sampling frequency. A preselection filter 16 allows only the desired signal to pass through. Its bandwidth should be less than the sampling frequency. The sampling mixer 3 carriers out two functions, a mixing and a multiplication of the frequency $f_G$ of the pulses G, which is equivalent to a multiplication of the factor $P_{14}$ by a sampling factor $P_e$ which is the integer closest to the ratio $\overline{f}/f_G$ where $\overline{f}$ is the mean input frequency.

The formula (2) becomes $$\frac{f_1}{f_o} = \frac{q_{14}P_{13} + P_e P_{14} q_{13}}{P_e P_{14} q_{13} - q_{14} P_{13}};$$

The numerical values of the preceding example are the same except for the multiplication factor which is equal to 1 whilst the sampling factor $P_e$ is equal to 51. The pre-selection filter 16 should have a band pass $B > f_2$.

If Q = 100 : quality factor of the filter
$\overline{f}$ = 102 MHz: mean input frequency
then $B = \overline{f}/Q = 1.02$ MHz.

The receiver shown in FIG. 5 has the same properties as that in FIG. 4. Moreover, the technique of mixing by sampling uses a passive mixer as frequency multiplier, without any high frequency active circuit, a feature which makes it possible to maintain the power consumption of the receiver at a very low level, of the order of a few micro-watts.

The system according to the present invention has numerous advantages. It uses a frequency shift modulation transmission by attributing the frequencies $f_o$ and $f_I$ to the digits "O" and "I". The message is transmitted and demodulated by applying to the control loop a disturbance equivalent to a phase jump. A phase jump corresponds to a smaller disturbance than a jump or even a frequency ramp. On the other hand, demodulation is simple and amounts to determining whether the equilibrium phase of the intermediate frequency signal is 0° and 180°.

The system according to the present invention also permits optimal use of the transmission channel by making the useful bandwidth of the channel equal to the noise bandwidth of the control loop. Upon the reception of a signal, the controlled oscillator is locked onto a frequency independent of the control of the message. Moreover the receiver according to FIG. 4 makes it possible, by the free choice of the specific frequency of the controlled oscillator 7, to optimize the latter from the point of view of performance and price.

It should be noted again that, due to the obviation of high frequency active circuits in the receiver shown in FIG. 5, the power consumption is low.

Figure 6:
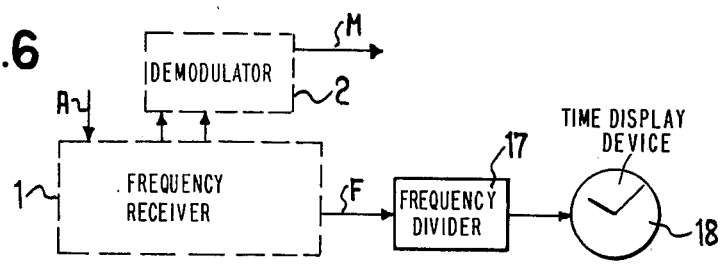
FIG. 6 is a block diagram which shows a possible application of the present invention.

FIG. 6 shows a particular application of the present invention.

In FIGS. 3, 4 and 5, an arrow F indicates that it is possible to take the signal issuing from the oscillator for other purposes. In FIG. 6, this signal F feeds a frequency divider 17 which controls a time display device 18. This system behaves like a secondary clock; in fact the frequency of the local oscillator 7 is regulated by the signal emitted for as long as a signal is being received, whether a message is transmitted or not; it may therefore serve as a time basis for a time-keeping apparatus, for example a watch.

I claim:

1. A device for receiving information by frequency shift keying, the received information being a binary input signal wherein two characteristic frequencies corresponding to the binary digits "O" and "I" are in a predetermined ratio, comprising a phase-locking superheterodyne receiver having only one local oscillator phase controlled by the input signal and a mixer for producing an intermediate signal frequency equivalent to half the shift of the input signal frequency, the said shift being defined by the difference between the two characteristic frequencies of the digits "O" and "I", and a demodulator formed by a phase detector coupled to receive the intermediate frequency signal and a signal of the same frequency obtained from the local oscillator, said phase detector determining whether, in balance, the phase between these signals is in the region of 0° or 180°.

2. A device according to claim 1 wherein the receiver comprises at least one mixer followed by an amplifier and then a phase comparator to provide an error voltage to a loop filter which controls the local oscillator that feeds the mixer and a frequency divider connected to said phase comparator, the said error voltage being a measure of the phase difference between the amplified intermediate frequency signal and the output signal of the frequency divider; and said demodulator comprising at least one phase shifter changing the phase of the output signal of the divider by $\pi/2$, said phase detector comparing the amplified intermediate frequency signal with that of the output signal of the phase shifter.

3. A device according to claim 2 wherein the characteristic frequencies $f_o$ and $f_I$ of the digits "O" and "I" are determined by a ratio $q$ of the frequency divider by the equation $$\frac{f_I}{f_o} = \frac{\left(1 + \frac{1}{q}\right)}{\left(1 - \frac{1}{q}\right)}$$

4. A time measuring device including the receiver according to claim 1, wherein the local oscillator of the said receiver serves as a time standard for time measurement, the local oscillator being regulated to a precise value during the reception of a signal, independently of the transmission of a message time display means responsive to said regulated local oscillator to indicate the time.

5. A device according to claim 1, wherein the receiver comprises at least one mixer followed by an amplifier, which is followed by a phase comparator to provide an error voltage to a loop filter which controls the local oscillator, a first frequency multiplier-divider connected to the output of the local oscillator, said first multiplier-divider feeding a second and a third multiplier-divider, the said second multiplier-divider feeds said phase comparator and the third multiplier-divider feeds said mixer, the said error voltage being a measure of the phase difference between the amplified intermediate frequency signal and the output signal of the second multiplier-divider; said demodulator comprising at least one phase shifter changing the phase of the output signal of second multiplier divider by $\pi/2$ and a phase detector comparing the amplified intermediate frequency signal with that of the output signal of said phase shifter.

6. A device according to claim 5, wherein the ratio of the characteristic frequencies $f_o$ and $f_I$ of the digits "O" and "I" is determined by multiplier $P_{13}$ and divisor $q_{13}$; of the second multiplier-divider feeding the phase comparator and by multiplier $P_{14}$ and divisor $q_{13}$ of the third multiplier-divider feeding the mixer according to the equation $$\frac{f_I}{f_o} = \frac{q_{14} \cdot P_{13} + P_{14} \cdot q_{13}}{P_{14} \cdot q_{13} - q_{14} \cdot P_{13}}.$$

7. A device according to claim 5, wherein said mixer of effects a heterodyning by sampling the input signal by means of low frequency pulses with a sampling period of less than the half-period of the input signal, supplied by a pulse generator synchronized by a signal derived from the local oscillator.

8. A device according to claim 7, wherein the ratio of the characteristic frequencies $f_o$ and $f_I$ of the digits "O" and "I" is determined by multiplier $P_{13}$ and the divisor $q_{13}$ of the second multiplier-divider, the multiplier $P_{14}$ and the divisor $q_{14}$; of the third multiplier-divider and by a sampling factor $P_e$ according the equation $$\frac{f_I}{f_o} = \frac{q_{14} \cdot P_{13} + P_e \cdot P_{14} \cdot q_{13}}{P_e \cdot P_{14} \cdot q_{13} - q_{14} \cdot P_{13}}.$$

* * * * *

UNITED STATES PATENT OFFICE
CERTIFICATE OF CORRECTION

PATENT NO. : 4,053,836
DATED : October 11, 1977
INVENTOR(S) : JEAN FELLRATH

It is certified that error appears in the above-identified patent and that said Letters Patent are hereby corrected as shown below:

Claim 5, line 15 (Column 11, line 6), change "and a" to -- said --.

Claim 7, line 2, (Column 12, line 6), delete "of".

Claim 8, line 6, (Column 12, line 16), before "the" insert -- to --.

Signed and Sealed this

Eighteenth Day of April 1978

[SEAL]

Attest:

RUTH C. MASON
Attesting Officer

LUTRELLE F. PARKER
Acting Commissioner of Patents and Trademarks